United States Patent
Moldoveanu

(10) Patent No.: US 6,961,284 B2
(45) Date of Patent: Nov. 1, 2005

(54) SOURCE ARRAY FOR USE IN MARINE SEISMIC EXPLORATION

(75) Inventor: Nicolae Moldoveanu, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 143 days.

(21) Appl. No.: 10/240,563

(22) PCT Filed: Mar. 29, 2001

(86) PCT No.: PCT/IB01/00521

§ 371 (c)(1),
(2), (4) Date: Apr. 21, 2003

(87) PCT Pub. No.: WO01/75481

PCT Pub. Date: Oct. 11, 2001

(65) Prior Publication Data

US 2004/0008577 A1 Jan. 15, 2004

Related U.S. Application Data

(60) Provisional application No. 60/194,301, filed on Apr. 3, 2000.

(30) Foreign Application Priority Data

Aug. 4, 2000 (GB) .............................................. 0019054

(51) Int. Cl.[7] .............................. G01V 1/38; G01V 1/02
(52) U.S. Cl. ........................ 367/154; 367/15; 367/141; 367/144; 367/153; 181/118; 181/120
(58) Field of Search ............................ 367/15, 20, 144, 367/153, 154; 181/110, 115, 118, 120

(56) References Cited

U.S. PATENT DOCUMENTS

| | | | | |
|---|---|---|---|---|
| 4,721,180 A | * | 1/1988 | Haughland et al. | 181/111 |
| RE32,683 E | * | 5/1988 | Ray | 367/23 |
| 4,956,822 A | * | 9/1990 | Barber et al. | 367/23 |
| 5,200,927 A | * | 4/1993 | Cretin et al. | 367/13 |
| 5,281,773 A | * | 1/1994 | Duren | 181/111 |
| 5,384,752 A | * | 1/1995 | Duren et al. | 367/38 |
| 5,774,417 A | * | 6/1998 | Corrigan et al. | 367/24 |
| 6,044,038 A | * | 3/2000 | Allensworth | 367/16 |
| 6,230,840 B1 | * | 5/2001 | Ambs | 181/113 |
| 6,493,636 B1 | * | 12/2002 | DeKok | 702/17 |

FOREIGN PATENT DOCUMENTS

WO    WO 94/09385   *   4/1994   ............ G01V/1/00

* cited by examiner

Primary Examiner—Bernarr E. Gregory
Assistant Examiner—Scott A. Hughes
(74) Attorney, Agent, or Firm—WesternGeco. L.L.C.

(57) ABSTRACT

A staggered vertical marine seismic source contains upper and lower arrays (10, 11) of emitters of seismic energy (S11, S12; S21, S22). The upper array (10) is horizontally displaced relative to the lower array (11). The source is used in a marine seismic surveying arrangement that has means for moving the source and at least one seismic receiver.

In use, the source is moved through the water in a direction parallel to the direction in which the two arrays are displaced. The arrays (10, 11) are fired sequentially, and the time delay between the firing of the first-fired array and firing of the second-fired array is chosen such that each seismic emitter in one array is fired at the same x- and y-co-ordinates as the corresponding emitter in the other array. The seismic wavefields generated by firing the two arrays are thus generated at the same x- and y-co-ordinates, but at different depths.

The seismic data recorded at the receiver(s) as a consequence of firing the first array can be used to de-ghost the seismic data acquired as a result of firing the second array or vice-versa, thereby eliminating or reducing the effect of source-side ghost reflections and reverberations.

15 Claims, 5 Drawing Sheets

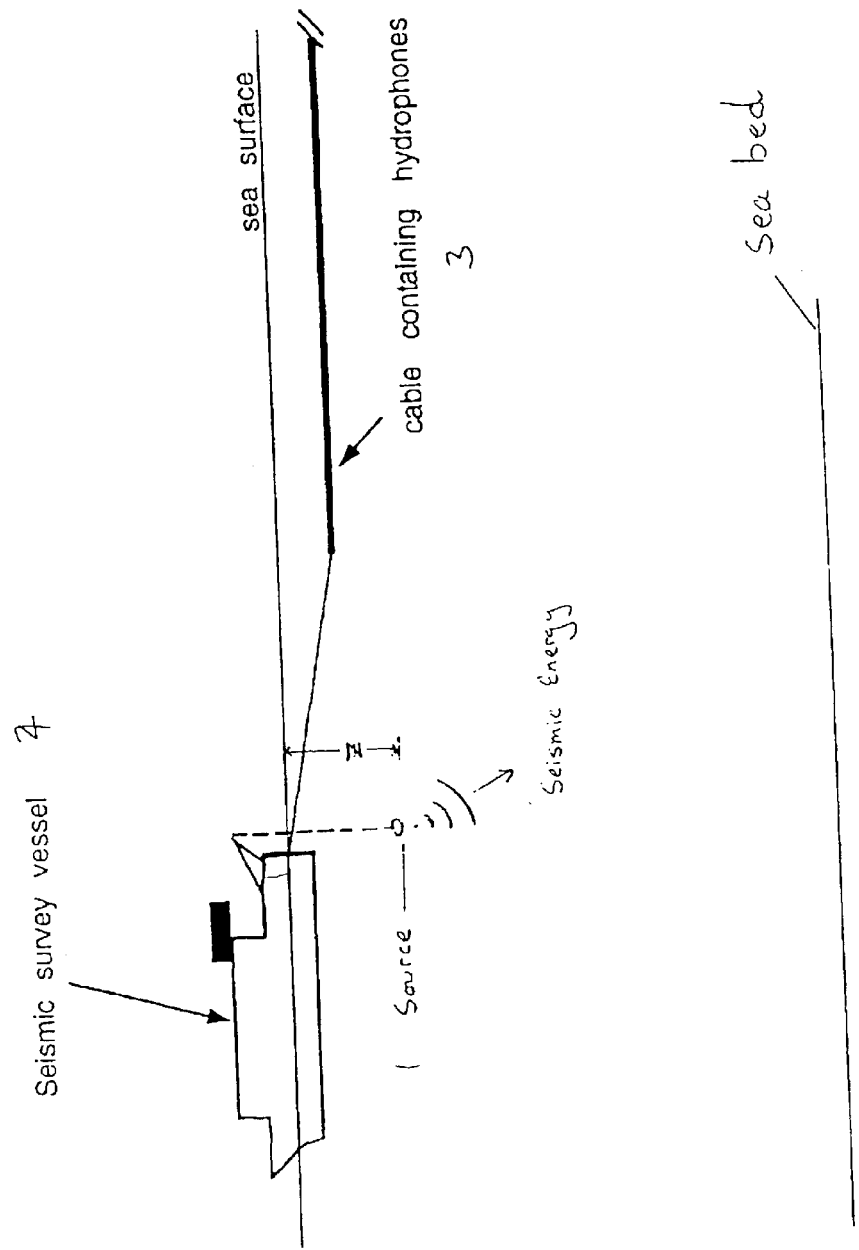

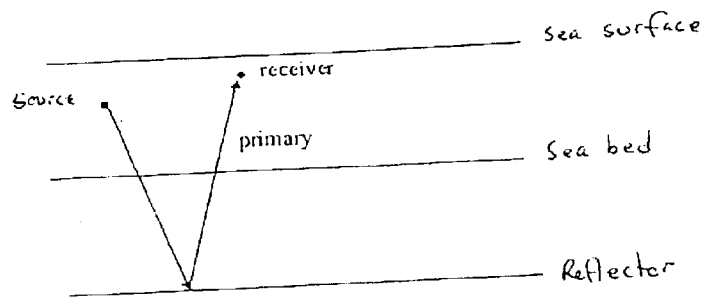
2(a)
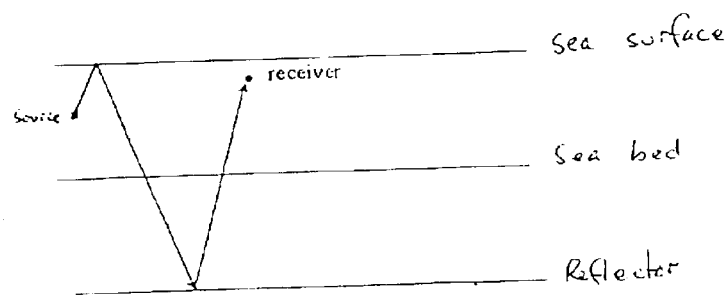
2(b)
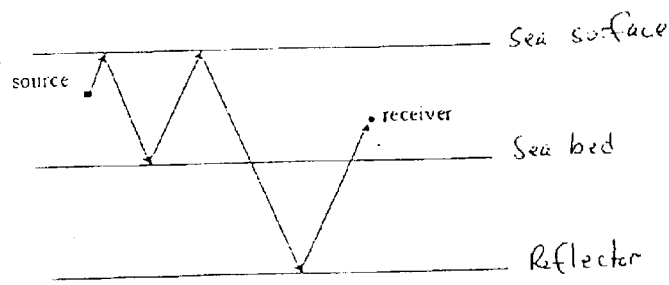
2(c)
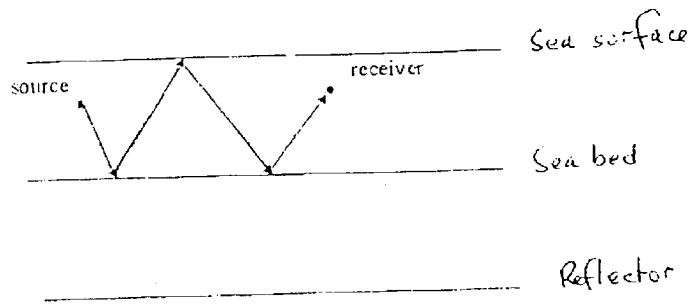
2(d)

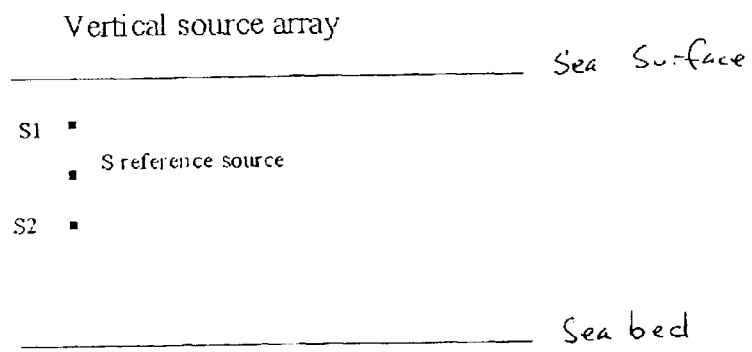
Figure 3. Vertical source array with two sources, S1 and S2. S is a hypothetical reference source at the midpoint between S1 and S2
Figure 4
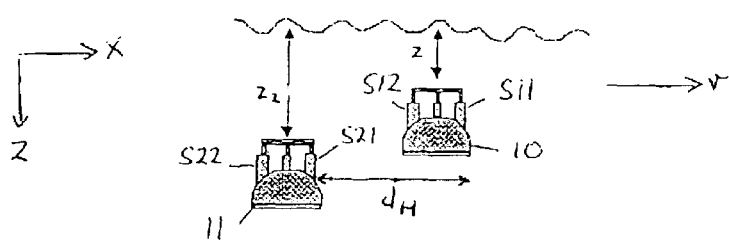

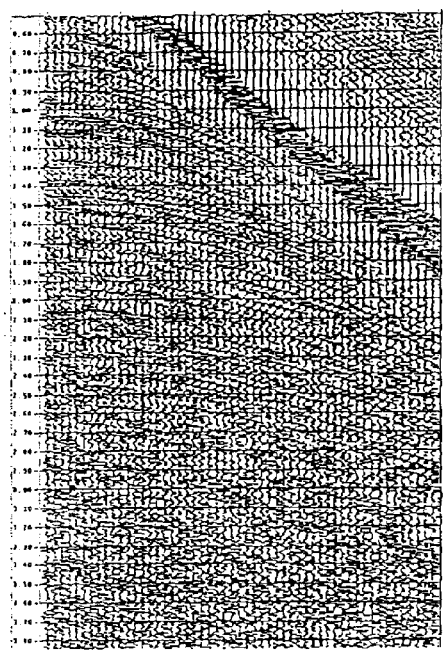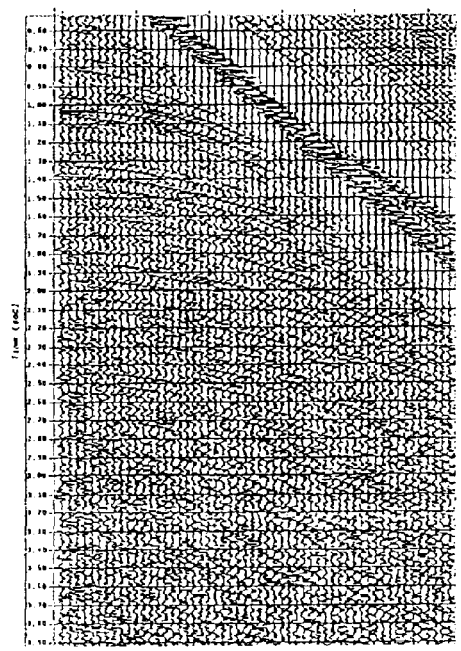
Figure 5. A hydrophone record generated by the source array deployed at 10m depth (under source)
Figure 6. The hydrophone record after the wavefield separation process was applied at the source-side

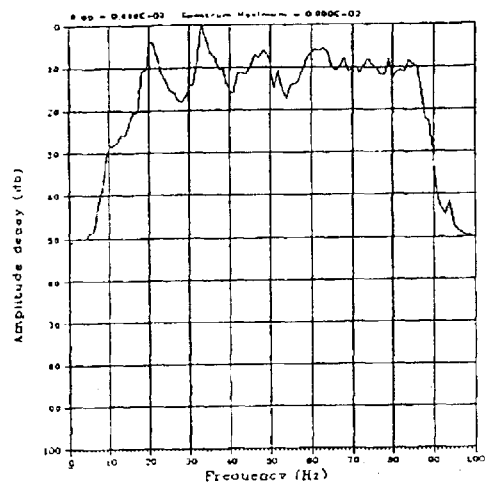
Figure 7. Average amplitude spectrum of the hydrophone record before wavefield separation
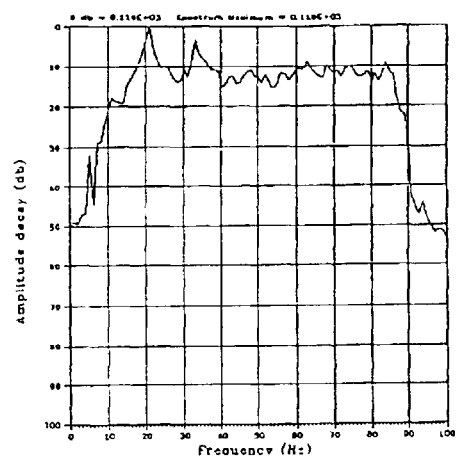
Figure 8. Average amplitude spectrum of the hydrophone record after the wavefield separation at the source side

SOURCE ARRAY FOR USE IN MARINE SEISMIC EXPLORATION

This application claims the benefit of Provisional Application No. 60/174,301, filed Apr. 3, 2000.

The present invention relates to a seismic source, in particular to a source for use in marine seismic surveying. The present invention also relates to a marine seismic surveying arrangement including a source, to a method of operating the source and to a method of de-ghosting marine seismic data.

The principle of marine seismic surveying is shown schematically in FIG. 1. Seismic energy emitted in a generally downwards direction from a source of seismic energy 1 is reflected by the sea bed 2 and by the earth strata or geological structures beneath the sea bed, and is received by an array of seismic receivers 3 such as hydrophones. Analysis of the energy received at the receiving array 3 can provide information about the earth strata or geological structures beneath the seabed. In the marine seismic surveying arrangement shown in FIG. 1, the source of seismic energy 1 is suspended from a survey vessel 4 and the array of seismic receivers 3 is towed by the survey vessel 3.

One problem associated with conventional marine seismic surveying is that of "ghost reflections". Ghost reflections occur when upwardly travelling seismic energy is reflected or scattered downwards at the sea surface. A related problem in marine seismic surveying is that of "reverberations". Reverberations occur when seismic energy is reflected between the sea surface and the sea-bed. The problems of ghost reflections and reverberations are explained in FIGS. 2(a) to 2(d).

FIG. 2(a) shows a "primary reflection". Seismic energy is emitted downwards by the source 1, is reflected by a geological feature below the sea bed, and the reflected signal is detected at the receiver 3. An analysis of the seismic signal generated by the primary reflection provides information about the geological feature responsible for reflecting the seismic energy. (In practice, refraction may occur at the sea-bed, but this has been omitted from FIGS. 2(a) to 2(d) for clarity.)

FIG. 2(b) shows a ghost reflection. Seismic energy that has been emitted upwards by the source is reflected or scattered downwards by the sea surface. The seismic energy that is reflected or scattered downwards may then be incident on the target geological feature, undergo reflection, and be reflected to the receiver. Seismic energy that follows the path shown in FIG. 2(b) will have a different travel time from the source to the receiver than will energy that follows the primary path of FIG. 2(a). Ghost reflections are an undesirable source of contamination of seismic data since they tend to obscure the interpretation of data produced by the primary reflection.

FIGS. 2(c) and 2(d) show reverberations, in which seismic energy undergoes reflections between the sea-bed and the sea-surface. Reverberations can occur in the case of seismic energy emitted in an up-going direction by the source (FIG. 2(c)) and also in the case of seismic energy emitted in a down-going direction by the source (FIG. 2(d)). As is the case for ghost reflections, reverberations are an undesirable source of contamination of seismic data, since they obscure the interpretation of the primary reflection from the earth's interior.

FIGS. 2(b), 2(c) and 2(d) show source-side ghost reflections and reverberations—that is, ghost reflections and reverberations that occur before the seismic energy is reflected by the target geological structure. (Indeed it will be noted that the path of seismic energy shown in FIG. 2(d) does not involve a reflection by the target geological structure.) Ghost reflections and reverberations can also occur after the seismic energy has been reflected from the target geological structure, and these are known as receiver-side ghost reflections or reverberations.

A number of schemes for minimising the effect of ghost reflections and reverberations on seismic data have been proposed. For most survey arrangements, the attenuation of ghost reflections and reverberations is equivalent to separating the up-going and down-going seismic wave fields.

F. J. Barr and J. J. Saunders have proposed, in a paper presented at the 59th SEG Meeting (1989), a method of attenuating ghost reflections and reverberations by recording the reflected seismic signal using two different types of seismic receivers, namely using both hydrophones and geophones. The up-going wave field is recorded by the hydrophone and the geophone with the same polarity, while the down-going wave field is recorded by the hydrophone and the geophone with opposite polarities. The difference between the signal recorded by the hydrophone and the signal recorded by the geophone allows the up-going wavefield to be separated from the down-going wavefield.

An alternative method for attenuating ghost reflections and reverberations is to use two receivers located at different depths. This method is based on the principle that waves travelling in different directions will have spatial derivatives of different signs, so that comparing the signal obtained at one receiver with the signal obtained by the other receiver will allow the up-going wavefield to be separated from the down-going wavefield.

These prior art methods separate the up-going and down-going wave fields at the receiver location. That is, they attempt to remove the ghost reflections and reverberations that arise after the seismic energy has been reflected by the target geological structure. This is known as receiver-side deghosting. These prior art methods do not, however, address the problem of the ghost reflections and reverberations that occur before the seismic energy is reflected by the target geological structure.

A first aspect of the present invention provides a marine seismic source comprising: a first array of N emitters of seismic energy, where N is an integer greater than 1; and a second array of N emitters of seismic energy; wherein, in use, the first array is disposed at a first depth and the second array is disposed at a second depth greater than the first depth, and the $j^{th}$ emitter of the first array (j=1, 2 ... N) is displaced by a non-zero horizontal distance $d_H$ from the $j^{th}$ emitter of the second array along a first direction; and the jth emitter of the first array and the jth emitter of the second array both lie in a vertical plane parallel to the first direction.

The use of two arrays of emitters of seismic energy at different depths allows the up-going and down-going seismic wavefields to be separated from one another, as will be described below. The effect of source-side ghost reflections and reverberations on the seismic data can be reduced or eliminated.

A second aspect of the present invention provides a marine seismic surveying arrangement comprising a marine seismic receiver; and a seismic source as defined above; means for moving the seismic source; and one or more seismic receivers.

A third aspect of the present invention provides a method of operating a marine seismic source as defined above, the method comprising the steps of: moving the seismic source at a speed v along the first direction; firing one of the first and second arrays of emitters of seismic energy; and firing the other of the first and second arrays of emitters of seismic energy after a time $d_H/v$. The time delay of $d_H/v$ between the firings of the two arrays of seismic sources ensures that each emitter of one array is fired at the same point in the x- and y-directions as the corresponding emitter of the other array, but at different depths. This allows the seismic data generated by one of the arrays to be used to de-ghost the seismic data generated by the other of the arrays.

A fourth aspect of the present invention provides a method of processing marine seismic data comprising the steps of: firing a first emitter of seismic energy at a point in a fluid medium having components $(x_1, y_1, z_1)$, and detecting the resultant first seismic data at a receiver array; firing a second emitter of seismic energy at a point in the fluid medium having components $(x_1, y_1, z_2)$, where $z_1 \neq z_2$, and detecting the resultant second seismic data at the receiver array; and using the second seismic data to reduce the effects of source-side reflections and/or scattering at the sea surface on the first seismic data.

Preferred features of the invention are set out in the dependent claims.

Preferred embodiments of the present invention will now be described by way of illustrative examples with reference to the accompanying figures, in which:

FIG. 1 is a schematic view of a typical marine seismic surveying arrangement;

FIGS. 2(a) to 2(d) are schematic illustrations of the problems of ghost reflections and reverberations;

FIG. 3 is a schematic view of a vertical source array illustrating the principles of the de-ghosting method of the present invention;

FIG. 4 is a schematic illustration of a vertical source array according to an embodiment of the present invention;

FIG. 5 shows a typical seismic signal recorded by a receiver in a marine seismic surveying arrangement that contains a seismic source according to an embodiment of the present invention;

FIG. 6 shows the signal of FIG. 5 after processing to attenuate source-side ghost reflections and reverberations;

FIG. 7 illustrates the average amplitude spectrum of the signal of FIG. 5; and

FIG. 8 illustrates the average amplitude of the signal of FIG. 6.

FIG. 3 illustrates the general principle of the de-ghosting method of the present invention. FIG. 3 shows a vertical source array that consists of two emitters of seismic energy S1 and S2 that have identical emission characteristics to one another. The emitters are disposed in the water at two different depths. The upper emitter S1 is disposed substantially vertically above the lower emitter S2.

The source array generates a seismic wavefield that has both up-going and down-going components. The wavefield travelling upwards generates source-side ghost reflections and up-going reverberations in the water layer. The wavefield travelling downwards from the source array generates the primary reflection and also generates down-going reverberations.

Consider a hypothetical emitter of seismic energy S having identical emission characteristics to the emitters S1 and S2, placed at the mid-point between the upper emitter S1 and the lower emitter S2. This emitter S would generate up-going and down-going source wavefields at a reference time t. The total wavefield S(t) emitted by the hypothetical emitter S is the sum of the up-going and down-going source wavefields, that is:

$$S(t)=u(t)+d(t) \quad (1)$$

In this equation, u(t) is the up-going source wavefield and d(t) is the down-going source wavefield emitted by the hypothetical emitter S.

The emitters S1 and S2 generate up-going and down-going wavefields. These wavefields can be described, relative to time t, by the following equations:

$$S_1(t)=u(t-dt)+d(t+dt) \quad (2)$$

$$S_2(t)=u(t+dt)+d(t-dt) \quad (3)$$

In these equations, $S_1$ is the wavefield emitted by the upper emitter S1 and $S_2$ is the wavefield emitted by the lower emitter S2. The time dt is the time that seismic energy would take to travel from the upper or lower emitter S1 or S2 to the position of the hypothetical emitter S. Since the hypothetical emitter S is at the mid-point between the upper emitter S1 and the lower emitter S2, the time dt is equal to half the time taken for seismic energy to travel between the upper emitter $S_1$ and the lower emitter $S_2$ or vice versa.

On the assumption that dt is small, the terms in equations (2) and (3) can be expanded using a first-order Taylor expansion, as follows:

$$S_1(t)=u(t)-u'(t)dt+d(t)+d'(t)dt \quad (4)$$

$$S_2(t)=u(t)+u'(t)dt+d(t)-d'(t)dt \quad (5)$$

In equations (4) and (5), u'(t) and d'(t) are the time derivatives of u(t) and d(t)1, respectively.

The sum of the two source wavefields $S_1$ and $S_2$ and the difference between the two source wavefields $S_1$ and $S_2$ can be derived from equations (4) and (5) as follows:

$$\text{Sum}=S_1(t)+S_2(t)=2u(t)+2d(t) \quad (6)$$

$$\text{Dif}=S_2(t)-S_1(t)=2u'(t)dt-2d'(t)dt \quad (7)$$

Integrating both sides of equation (7) with respect to time leads to the following result:

$$\text{Intdif}=2u(t)dt-2d(t)dt \quad (8)$$

Equations (6) and (8) may now be combined, to eliminate u(t). This leads to the following expression for the down-going source wavefield d(t):

$$d(t)=(\text{Sum}-\text{Intdif}/dt)/4 \quad (9)$$

Thus, by using a vertical source array that consists of two emitters of seismic energy that have identical emission characteristics, with one emitter disposed above the other, it is possible to derive the down-going source wavefield d(t) using equation (9) above. This allows the effect of the up-going wavefield u(t) to be eliminated when seismic data acquired using the source is processed.

The principle of reciprocity is a fundamental principle of wave propagation, and states that a signal is unaffected by interchanging the location and character of the sources and receivers. For example, if a surveying arrangement with an array of seismic sources at point A and a receiver at point B gives a certain signal at the receiver, then using a receiver array at point A and a single source at point B would lead to the same signal, provided that the source array corresponds to the receiver array. (By "corresponds") it is meant that the source array contains the same number of sources as the receiver array has receivers, and that the sources in the source array are arranged in the same locations relative to one another as the receivers in the receiver array.)

One consequence of the principle of reciprocity is that the theory described above with relation to equations (1) to (9) above could be used for wave field separation using two vertically separated receivers. This would provide a method of receiver-side de-ghosting, which would enable the up-going wave field at the receiver, which contains the primary reflection, to be separated from the down-going wavefield caused by reflection or scattering at the sea surface.

The above discussion relates to a vertical source array that contains just two emitters, with one emitter being disposed above the other. However, the same principle can be applied to a source that comprises a first array of two or more emitters of seismic energy disposed above a second array of two or more emitters of seismic energy. It is, however, necessary for the first and second arrays of emitters to have substantially identical emission characteristics to one another—that is, each emitter array must contain the same number of emitters, and each emitter in one array must have identical emission characteristics to the corresponding emitter in the other array. Furthermore, the relative arrangement and separation of the emitters in one array must be the same as the relative arrangement and separation of the emitters in the other array.

If the upper and lower emitters S1 and S2 were fired simultaneously, a receiver would record the combination of the wavefield generated by the upper emitter S1 and the wavefield generated by the lower emitter S2. It would therefore not be possible to apply the de-ghosting method outlined above, since the difference between the two wavefields would not be known. To apply the method using the seismic source shown in FIG. 3, it would be necessary to maintain the source stationary in the water, and fire the two emitters one after the other. This would generate two distinct wavefields $S_1$, $S_2$ that could be recorded separately and processed according to equations (1) to (9). However, it would be inconvenient in practice to have to hold the source stationary in the water.

In principle, the two separate wavefields required for the de-ghosting method could also be obtained by using firing a single emitter at one depth, altering the depth of the emitter, and firing the emitter again. However, this method would also be inconvenient to carry out.

In a preferred embodiment of the present invention, therefore, a staggered vertical source is used consisting of two emitters or of two emitter arrays, with, in use, one emitter or emitter array being disposed at one depth and the other being disposed at a different depth. The two emitters, or two emitter arrays, are displaced horizontally with respect to one another. In use, the source is moved through the water in the direction along which the emitters, or emitter arrays, are displaced. There is a time delay between the firing of one of the emitters or emitter arrays and the firing of the other emitter or emitter array. The time delay between the firings and the speed of movement of the source are chosen such that, in the case of a source having just two emitters, the point at which the upper emitter is fired has the same x- and y-co-ordinates as the point at which the lower emitter is fired. In the case of a source having two arrays of emitters, the time delay between firing one array and firing the other array is chosen so that the point at which an emitter in one array is fired has the same x- and y-co-ordinates as the point at which the corresponding emitter in the other array is fired, for all emitters in the array. Thus, the invention makes it straightforward to generate identical seismic wavefields at different depths but at the same x- and y-co-ordinates. The seismic data generated by one wavefield can then be used to de-ghost the seismic data generated by the other wavefield, using equation (9) above.

FIG. 4 shows an embodiment of the invention in which the source includes two arrays 10, 11 each having two emitters of seismic energy S11, S12; S21, S22. The four emitters S11, S12; S21, S22 have substantially identical emission characteristics to one another. The separation between the two emitters S11, S12 of the first array 10 is substantially equal to the separation between the two emitters S21, S22 of the second array. In this embodiment, one array 10 is disposed at a depth of four metres, whereas the other array 11 is disposed at a depth of 10 metres. The axis of each emitter array is preferably horizontal, so that each emitter S11, S12 of the first array 10 is at a depth of 4 metres and each emitter S21, S22 of the second array 11 is at a depth of 10 m. The source is intended to be moved through the water at a speed v, and this is most conveniently done by towing the source from a survey vessel, as shown in FIG. 1.

In addition to being separated in the vertical direction (z-direction), the two arrays are also displaced in a horizontal direction. The direction of displacement of the two arrays is the direction in which the source is towed in use. The arrays are displaced by a horizontal distance $d_H$. In FIG. 4, the direction in which the arrays are displaced, and in which the source is moved in use, is chosen to be the x-direction for convenience of description.

The two arrays are not displaced in the direction perpendicular to the direction of movement of the source (in FIG. 4 this is the y-direction and extends out of the plane of the paper). An emitter of one array and the corresponding emitter of the other array are both disposed in a common vertical plane, that is parallel to the direction of movement of the source.

The difference in depth between the first and second emitter arrays should be chosen such that $1/dt < f_{max}$, where $f_{max}$ is the maximum frequency in the seismic data. The time dt is determined by the depth difference between the two emitter arrays and by the velocity of seismic energy in water, which is a known quantity. The embodiment of FIG. 4 is intended for use with a maximum frequency $f_{max} \leq 90$ Hz, and a depth difference of 6 m has been found to be acceptable in this case.

As noted above, the two emitter arrays of the source shown in FIG. 4 have a horizontal displacement, $d_H$. The horizontal displacement is measured between an emitter of the array nearer the towing vessel and the corresponding emitter of the array further from the towing vessel.

The marine seismic source shown in FIG. 4 can be used in a marine seismic surveying arrangement. In addition to the source, the arrangement would also comprise one or more seismic receivers, and means, such as a towing vessel, for moving the source through the water. The marine seismic surveying arrangement would also comprises control means for firing the emitters, and recording means for recording seismic data acquired by the receiver(s).

In a particularly preferred embodiment, the horizontal displacement between the two emitter arrays is substantially equal to the shot point interval of the marine seismic surveying arrangement. Thus, for a seismic surveying arrangement that generates a shot point interval of, for example, 25 m, the horizontal displacement of the emitter arrays of the seismic source is preferably approximately 25 m.

In this embodiment, the emitter arrays are fired in a "flip-flop" sequence at equal intervals of, in this example, 25 m. That is to say, the emitters on the array nearer the towing vessel are fired initially and they may be fired consecutively, or simultaneously. After a time delay that is equal to the time required for the towing vessel to travel 25 m, the emitters of the array further from the boat are fired. This results in two shot records generated at points having the same x-co-ordinate and the same y-co-ordinate, but at different depths.

In FIG. 4 the array at the shallower depth is shown as the array nearer the towing vessel. The invention is not limited to this, however, and the array at the shallower depth could be the array further from the towing vessel.

The signals generated at the receiver or receiver array as the result of firing the first emitter array and subsequently firing the second emitter array are recorded in any conventional manner. Since, as explained above, the signals were emitted by the two emitter arrays at the same x- and y-co-ordinates but at different z-co-ordinates, the results can be analysed using the theory outlined above with regard to equations (1) to (9). In particular, by calculating the sum of the two signals and the integral with respect to time of the difference between the two signals, it is possible to compute the down-going source wavefield using equation (9). Thus, the present invention enables the effects of the up-going source wavefield to be removed from the processed seismic data. The effect of source-side ghost reflections and reverberations is thus eliminated, or at least significantly reduced.

Results obtained using a seismic source according to the present invention and the de-ghosting method of the present invention are illustrated in FIGS. 5–8. These figures relate to a survey carried out using a source having two emitter arrays, each array having two marine vibrator arrays as the seismic emitters. The source was towed with the arrays at depths of 4 m and 10 m respectively, with a 25 m in line displacement (by "in-line displacement" is meant displacement along the towing direction) between the two arrays. The average water depth was 52 m. An ocean bottom cable (OBC) dual sensor cable, 10 km in length, disposed on the sea bed was used as the receiver. The two arrays of marine vibrators were fired in a flip-flop mode as described above.

The parameters of the survey arrangement are as follows:
Number of receiver stations: 204
Receiver interval: 25 m
Receiver depth: 52 m
Sweep bandwidth: 5–90 Hz
Fold: 90

The data recorded in the OBC sensors as a result of firing the emitter array at a depth of 10 m is shown in FIG. 5. This shows the data after preliminary processing operations. The emitter array at a depth of 4 m generated another record (not shown) at the same x, y location.

FIG. 6 illustrates the data of FIG. 5 after processing, using equation (9) and the data recorded using the emitter array at a depth of 4 m, to remove the up-going wavefield. That is, FIG. 6 shows the data of FIG. 5 after de-ghosting to remove the effect of source-side ghost events and reverberations.

FIGS. 7 and 8 show the average amplitude spectra for the seismic data of FIGS. 5 and 6 respectively. It will be seen that the resolution and the signal-to-noise ratio have both been improved by de-ghosting process.

In the preferred embodiment described above, the seismic source consists of two arrays each containing two marine vibrator units. The present invention is not, however, limited to this precise arrangement. For example, each of the source arrays could contain more than two emitters of seismic energy. Moreover the de-ghosting method of the present invention could in principle be applied if seismic data acquired using a single seismic emitter at one depth and seismic data acquired using an emitter having identical emission characteristics at a different depth (but at the same x- and y-co-ordinates) is available.

In the embodiment shown in FIG. 4, each receiver array is an in-line emitter array—that is, the emitters of each array are arranged along the axis of the array. The axis of each array is coincident with the towing direction when the source is in use. The invention is not, however, limited to use with in-line emitter arrays.

Furthermore, the seismic source of the invention is not limited to a source that contains marine vibrator units. The source could also consist of arrays of other emitters of seismic energy such as, for example, air guns.

What is claimed is:

1. A marine seismic source comprising:
a first array of N emitters of seismic energy, where N is an integer greater than one; and
a second array of N emitters of seismic energy, wherein, in use, the first array is disposed at a first depth and the second array is disposed at a second depth greater than the first depth, the $j^{th}$ emitter of the first array (j=1, 2 ... N) is displaced by a non-zero horizontal distance $d_H$ from the $j^{th}$ emitter of the second array along a first direction, and the $j^{th}$ emitter of the first array and the $j^{th}$ emitter of the second array both lie in a common vertical plane parallel to the first direction, wherein the horizontal displacement $d_H$ between the $j^{th}$ emitter of the first array and the $j^{th}$ emitter of the second array is substantially equal to a shot point interval of a surveying arrangement.

2. A marine seismic source as claimed in claim 1, wherein the N emitters of the first array are arranged along the axis of the first array and the N emitters of the second array are arranged along the axis of the second array.

3. A marine seismic source as claimed in claim 2, wherein, in use, the first and second arrays are disposed such that their axes lie substantially in a common vertical plane.

4. A seismic source as claimed in claim 2 wherein, in use, the first and second arrays are disposed such that the axis of the first array and the axis of the second array are each substantially horizontal.

5. A seismic source as claimed in claim 1, wherein each of the first and second arrays of emitters of seismic energy comprises N airguns.

6. A seismic source as claimed in claim 1, wherein each of the first and second arrays emitters of emitters of seismic energy comprises N marine vibrator units.

7. A marine seismic source comprising:
a first array of N emitters of seismic energy, where N is an integer greater than one; and
a second array of N emitters of seismic energy, wherein, in use, the first array is disposed at a first depth and the second array is disposed at a second depth greater than the first depth, the $j^{th}$ emitter of the first array (j=1, 2 ... N) is displaced by a non-zero horizontal distance $d_H$ from the $j^{th}$ emitter of the second array along a first direction, and the $j^{th}$ emitter of the first array and the $j^{th}$ emitter of the second array both lie in a common vertical plane parallel to the first direction, wherein the first and second depths are chosen such that the time taken for seismic energy to travel from the first depth to the second depth is greater than twice the reciprocal of the maximum frequency emitted, in use, by the seismic sources.

8. A marine seismic surveying arrangement, comprising:
a marine seismic source comprising:
a first array of N emitters of seismic energy, where N is an integer greater than one; and
a second array of N emitters of seismic energy, wherein, in use, the first array is disposed at a first depth and the second array is disposed at a second depth greater than the first depth, the $j^{th}$ emitter of the first array (j=1, 2 ... N) is displaced by a non-zero horizontal distance $d_H$ from the $j^{th}$ emitter of the second array along a first direction, and the $j^{th}$ emitter of the first array and the $j^{th}$ emitter of the second array both lie in a common vertical plane parallel to the first direction, wherein the horizontal displacement $d_H$ between the $j^{th}$ emitter of the first array and the $j^{th}$ emitter of the second array is substantially equal to a shot point interval of the surveying arrangement;

means for moving the seismic source; and an array of one or more seismic receivers.

9. A marine seismic surveying arrangement as claimed in claim 8 and further comprising control means for firing a selected one of the first and second arrays of emitters of seismic energy.

10. A marine seismic surveying arrangement as claimed in claim 8, wherein the shot point interval of the surveying arrangement is approximately 25 m.

11. A method of operating a marine seismic source having a first array of N emitters of seismic energy, where N is an integer greater than one; and a second array of N emitters of seismic energy, wherein, in use, the first array is disposed at a first depth and the second array is disposed at a second depth greater than the first depth, the $j^{th}$ emitter of the first array (j=1, 2 . . . N) is displaced by a non-zero horizontal distance $d_H$ from the $j^{th}$ emitter of the second array along a first direction, and the $j^{th}$ emitter of the first array and the $j^{th}$ emitter of the second array both lie in a common vertical plane parallel to the first direction the method comprising the steps of:

a) moving the seismic source at a speed v along the first direction;

b) firing one of the first and second arrays of emitters of seismic energy; and c) firing the other of the first and second arrays of emitters of seismic energy at a time $d_H/v$ after step (b).

12. A method as claimed in claim 11 wherein step (b) comprises firing the first array.

13. A method of processing marine seismic data comprising the steps of:

(a) disposing a first emitter of seismic energy and a second emitter of seismic energy such that the second emitter is displaced from the first emitter by a non-zero horizontal distance along a first direction;

(b) firing the first emitter of seismic energy at a point in a fluid medium having components $(x_1, y_1, z_1)$, and detecting the resultant first seismic data at a receiver array;

(c) firing the second emitter of seismic energy at a point in the fluid medium having components $(x_1, y_1, z_2)$, where $z_1 \neq z_2$, and detecting the resultant second seismic data at the receiver array; and (d) using one of the first and second seismic data to reduce the effects of source-side reflection and or scattering at the sea surface on the other of the first and second seismic data.

14. A method as claimed in claim 13 wherein step (d) comprises calculating $$d(t) = (\text{Sum} - \text{Intdif}/dt)/4$$

where Sum is the sum of the first and second seismic data, Intdif is the integral with respect to time of the difference between the first and second seismic data; and 2 dt is the time for seismic energy to travel from the point $(x_1, y_1, z_1)$ to the point $(x_1, y_1, z_2)$.

15. A method as claimed in claim 13, wherein the first and second emitters of seismic energy lie in a vertical plane parallel to the first direction.

* * * * *